United States Patent
Nakamura et al.

(10) Patent No.: US 6,545,721 B1
(45) Date of Patent: Apr. 8, 2003

(54) VIDEO RETIMING THROUGH DYNAMIC FIFO SIZING

(75) Inventors: Michael D. Nakamura, Portland, OR (US); John C. Reynolds, Beaverton, OR (US)

(73) Assignee: Omneon Video Networks, Sunnyvale, CA (US)

( * ) Notice: Subject to any disclaimer, the term of this patent is extended or adjusted under 35 U.S.C. 154(b) by 0 days.

(21) Appl. No.: 09/545,392

(22) Filed: Apr. 7, 2000

(51) Int. Cl.[7] .................................................. H04N 5/04
(52) U.S. Cl. ........................ 348/501; 348/510; 348/529; 348/547; 348/715
(58) Field of Search ................................. 348/501, 500, 348/510, 512, 513, 529, 523, 524, 525, 544–548, 536, 715, 555, 558; 345/213

(56) References Cited

U.S. PATENT DOCUMENTS

| | | | | |
|---|---|---|---|---|
| 4,668,974 A | * | 5/1987 | Kita et al. .................. 348/450 |
| 4,862,269 A | * | 8/1989 | Sonoda et al. .............. 348/514 |
| 5,185,603 A | * | 2/1993 | Medin ........................ 345/213 |
| 5,504,534 A | * | 4/1996 | Sakaegi ...................... 348/513 |
| 5,668,594 A | * | 9/1997 | Cahill, III ................... 348/194 |
| 5,671,260 A | * | 9/1997 | Yamauchi et al. .......... 375/372 |
| 5,946,049 A | * | 8/1999 | Cooper et al. .............. 348/513 |
| 6,037,994 A | * | 3/2000 | Bae ............................. 348/510 |
| 6,097,446 A | * | 8/2000 | Imbert et al. ............... 348/715 |
| 6,130,660 A | * | 10/2000 | Imsand ........................ 345/698 |
| 6,275,306 B1 | * | 8/2001 | Wataya et al. .............. 358/445 |
| 6,307,597 B1 | * | 10/2001 | Patton et al. ............... 348/565 |
| 6,326,960 B1 | * | 12/2001 | Wolf ............................ 345/212 |

\* cited by examiner

*Primary Examiner*—John Miller
*Assistant Examiner*—Jean W. Désir
(74) *Attorney, Agent, or Firm*—Blakely Sokoloff Taylor & Zafman

(57) ABSTRACT

A method and apparatus for retiming video. Vertical synchronization information (VSI) is detected in an incoming video stream. A VSI is also detected in both as output video stream and a reference video stream. Based on the difference between the VSI of the reference and output video stream reads or writes to a FIFO are suppressed until the VSI's are coincident.

20 Claims, 7 Drawing Sheets

VIDEO RETIMING THROUGH DYNAMIC FIFO SIZING

BACKGROUND

(1) Field of the Invention

The invention relates to synchronization of signals. More specifically, the invention relates to retiming of incoming video signals to match a reference video stream.

(2) Background

Video signals are composed of a number of horizontal lines which contain horizontal synchronizing information. A group of horizontal lines forms a frame or a field. The group that forms the field or frame is determined by a vertical synchronizing information (VSI). The VSI is embedded in the video stream. Interlaced video includes two fields of horizontal lines with the second field offset by a half line, such that when displayed simultaneously, greater resolution can be achieved. Typically, the first field of the interlace is received entirely before the second field of the frame begins to arrive. The two fields together form one interlaced frame. Each of the fields has its own associated VSI. Often, a digital video stream is desired to be synchronized with a reference video stream of the same clock frequency. To accomplish this, the incoming video stream needs to be delayed enough such that the frame or field boundaries (VSI) embedded in the two streams are coincident. Accomplishing this alignment in an automatic fashion without operator intervention has proven problematic.

BRIEF SUMMARY OF THE INVENTION

A method and apparatus for retiming video is disclosed. Vertical synchronization information (VSI) is detected in an incoming video stream. A VSI is also detected in both as output video stream and a reference video stream. Based on the difference between the VSI of the reference and output video stream reads or writes to a FIFO are suppressed until the VSI's are coincident.

DETAILED DESCRIPTION

Figure 1:
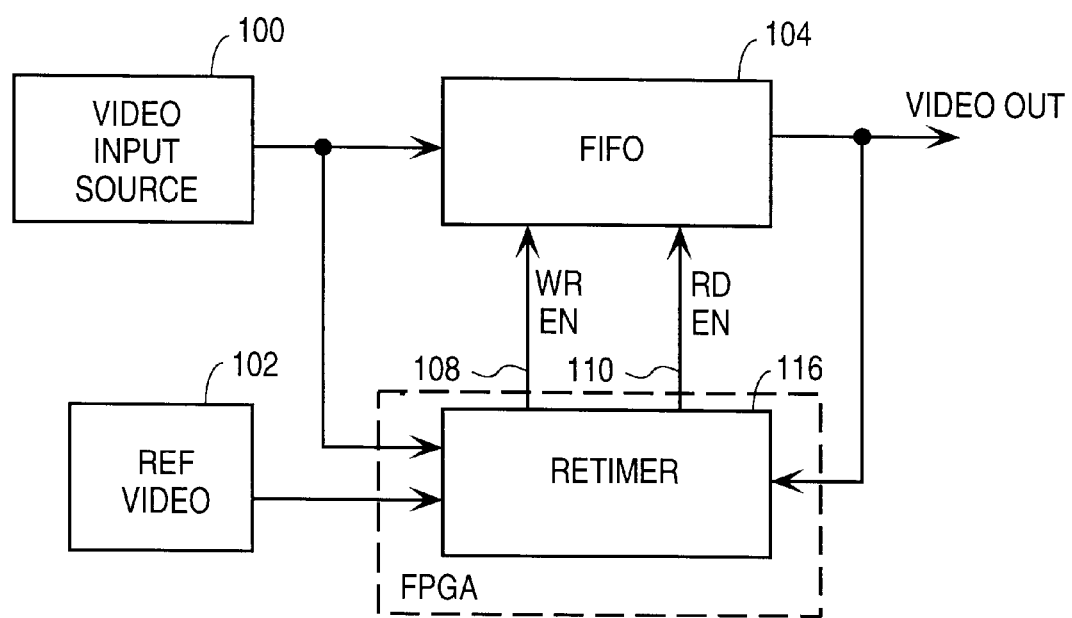
FIG. 1 is a block diagram of a system of one embodiment of the invention.

FIG. 1 is a block diagram of a system of one embodiment of the invention. Video input source 100 provides a video stream to a FIFO 104 and a retimer unit 116. The FIFO 104 delays the video stream some amount. That delayed stream constitutes the video output stream. The video output stream is also provided to the retimer 116 as an input. Reference video source 102 provides a reference video stream to the retimer 116. The retimer 116 causes the FIFO to delay the video output stream such that the video out has frame or field boundaries coincident with the reference video stream provided by reference video source 102. To accomplish this retiming, retimer 116 controls the assertions of a write enable 108 and a read enable 110 to FIFO 104. To determine how these signals should be controlled, the retimer 116 determines whether the FIFO 104 is too full or too empty based on the delay required to make vertical synchronizing information (VSI) of the output stream coincident with the VSI of the reference video stream. Then, if the FIFO is too empty, the read enable signal 110 is suppressed. Thus, fewer reads will occur while the same number of writes occur, thereby increasing the fill of the FIFO. Conversely, if the FIFO is too full, the write enable 108 is suppressed causing fewer writes to occur while the same number of reads occur, thereby reducing the fill of the FIFO such that a desired delay is achieved.

Figure 2:
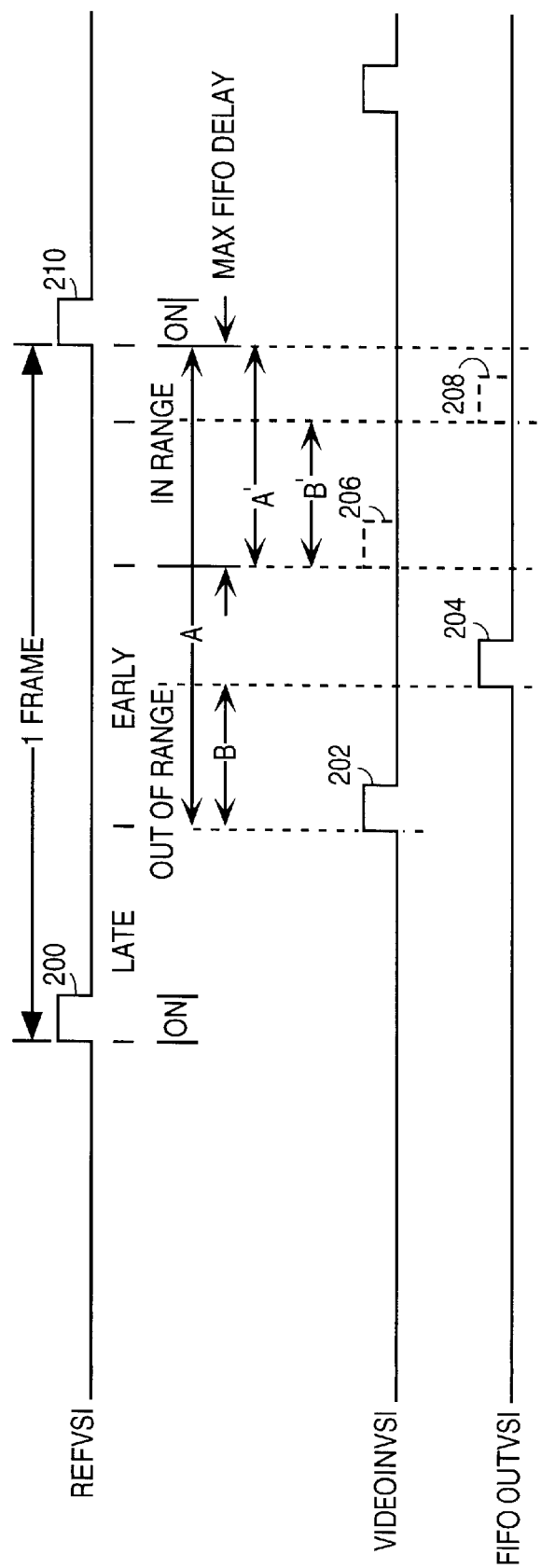
FIG. 2 is a timing diagram of the VSIs in one embodiment of the invention.

FIG. 2 is a timing diagram of the VSIs in one embodiment of the invention. The REFVSI signal is the VSI information extracted from the reference video stream. Similarly, the VIDINVSI signal is the VSI information extracted from the incoming video stream. FIFOOUTVSI signal is the VSI information extracted from the output video stream. VSI pulses delineate frame boundaries such that, for example, one frame occurs between the rising edge of the first pulse and the rising edge of the next pulse in the VSI signal. For example, the rising edge of pulse 200 and the rising edge of pulse 210 in the REFVSI signal delineate one frame. In this figure, two timing arrangements are shown: the first in solid lines and the second in phantom lines. In one embodiment, the VSI pulse of the video input stream causes a first and second counter within the retimer to begin counting. The next occurring VSI pulse in the output stream stops the second counter and the next VSI pulse in the reference stream stops the first counter. Thus, two counts are generated, one corresponding to the difference between the input VSI and the reference VSI and the second corresponding to the output VSI and the input VSI. There is, of course, a maximum delay that can be provided by the FIFO. Thus, if the input VSI pulse occurs more than the maximum FIFO delay away from the corresponding reference VSI pulse, synchronization is out of range. For example, pulse 202 cannot be synchronized with pulse 210 given the maximum FIFO delay shown. If the maximum FIFO delay is equal to or greater than one frame time, the out of range condition will not occur. However, typically, for cost reasons, the FIFO delay is limited based on the size of the FIFO to be less than one frame time. As shown, the time between pulse 202 and pulse 210 is equal to A counts while the time between pulse 202 and pulse 204 results in B counts. A minus B yields the number of counts that must be added to (or subtracted from the FIFO to have the timing ON such that the reference stream and output stream have coincident VSI. If instead the VSI input pulse is pulse 206 and the output pulse is pulse 208 the distance between the input and the reference is distance A' while the distance between the output and the input is B'. A' minus B' gives the number of pulses the FIFO must accommodate. Because A' is not greater than the maximum FIFO delay, synchronization is in range and can be accommodated by controlling the read and write enables of the FIFO.

Figure 3:
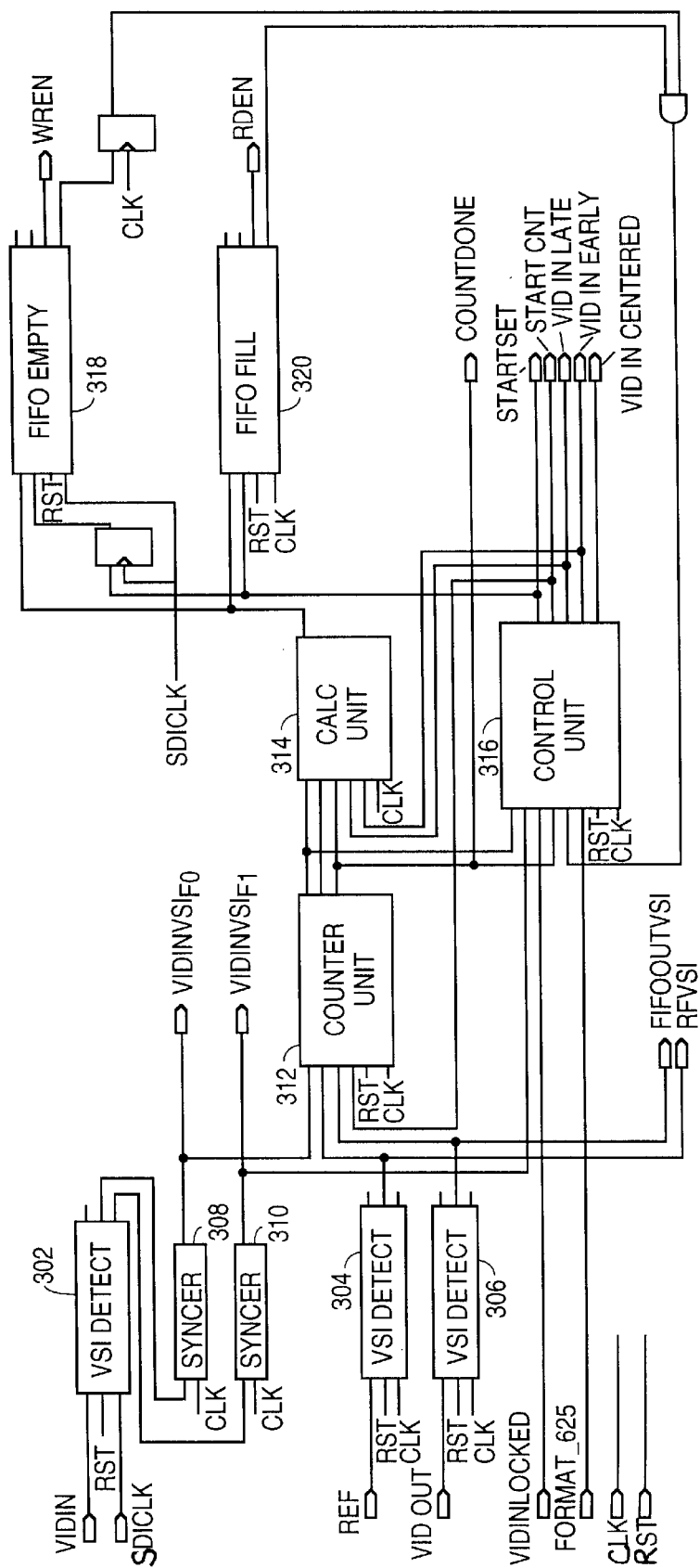
FIG. 3 is a block diagram of one embodiment of the retimer.

FIG. 3 is a block diagram of one embodiment of the retimer. VSI detect unit 302 receives an input video signal and responds to an external clock. The VSI detect unit 302 is responsible to detecting and extracting the VIDINVSI signal such as shown in FIG. 2. The VSI detect unit 302 extracts the VSI for both a field F0 and a field F1 of a frame. The respective VSI signals are passed through a syncer 308 and syncer 310 which are designed to ensure synchronization of that signal with a local clock (CLK). The VIDINVSI$_{F1}$ is used to restart the retiming process. However, any signal that was guaranteed not to arrive until the correction process, if needed, is completed is sufficient. Analogous VSI detectors 304 and 306 receive the reference video and video output to generate FIFOOUTVSI and REFVSI, respectively. The three VSI signals supply inputs to counter unit 312. In one embodiment, counter unit 312 includes a pair of counters and a state machine to control assertion and deassertion of the counters. When the state machine in counter unit 312 determines that the count is done, it asserts a DONE signal as well as the A value and B value to calculation unit 314 which calculates A minus B and supplies the signed value to FIFO FILL unit 320 and FIFO EMPTY unit 318. The counter unit 312 supplies the A value and the DONE value to the control unit 316. Control unit 316 determines early or late, based on these signals and generates an early or late output which is also supplied to the calculation unit 314. These signals may also be made available to a user. Control unit 316 also receives a VIDINLOCKED signal and a format signal indicating that the video in a particular format and valid video is entering the FIFO.

The FIFO fill unit 320 and the FIFO empty unit 318 are driven by control unit 316 and suppress a number of read enable or write enables, respectively, to cause coincidence between the reference video and the output video. FIFO EMPTY unit is driven by the external clock rather than the local clock, because the write enable should be synchronous with the incoming video stream. Retiming can occur on a periodic basis. Thus, changes in timing of the video input stream can be accommodated dynamically without operator intervention.

Figure 4:
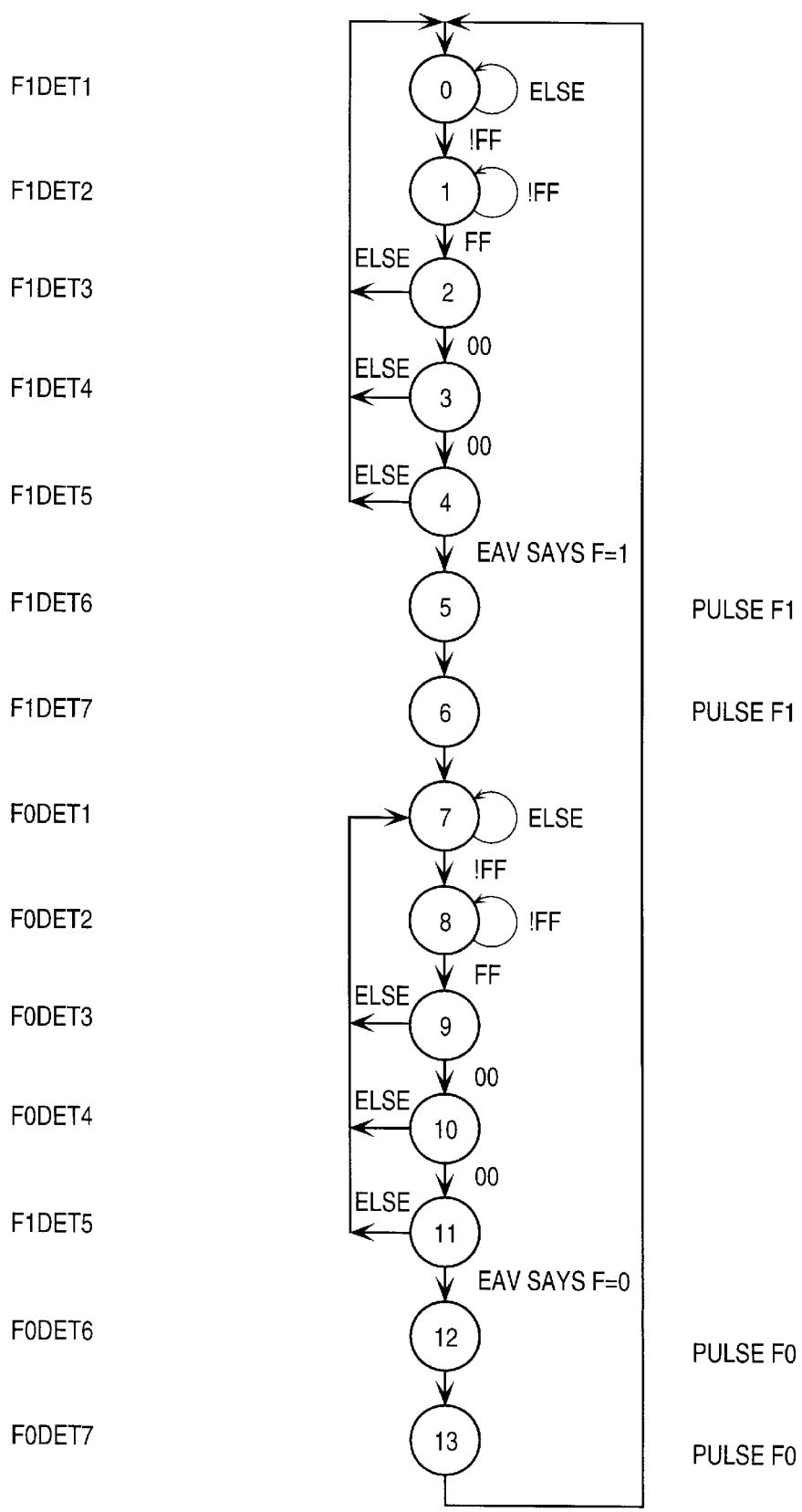
FIG. 4 is a state diagram of a state machine for a VSI detector to detect a VSI of an incoming video stream in one embodiment of the invention.

FIG. 4 is a state diagram of a state machine for a VSI detector to detect a VSI of an incoming video stream in one embodiment of the invention. The state machine remains in an initial state until a byte received is not all ones. Then, it transitions to state one, where it remains until it receives a byte that is all ones, at which point, it transitions into state two. From state two, if the next byte received is not all zeros, it transitions back to state zero. If the byte is all zeros, it transitions to state three. From state three, if the subsequent byte is all zeros, it transitions to state four. If at state four, End of Active Video (EAV) indicates that F=1, the state machine transitions through states five and six, pulsing F1 in those two states, thereby yielding a double-wide pulse. This double-wide pulse is used because the incoming signal is clocked by a different clock than the local clock. Thus, having a double-wide pulse corresponding to the VSI from the incoming field ensures proper triggering based on the local clock. States seven through thirteen are analogous to zero through six, but for field zero.

The other detectors which detect the VSI in the FIFO output stream and the reference video stream generate a single wide pulse by elimination of state six and thirteen. Those detectors are otherwise the same as the detector for the input stream.

Figure 5:
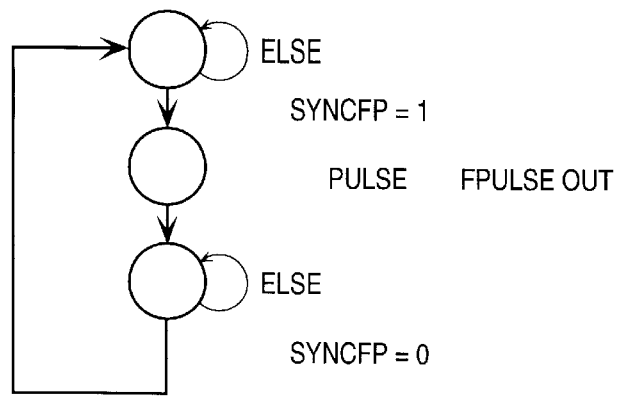
FIG. 5 is a state diagram of the state machine in a syncer unit of one embodiment of the invention.

FIG. 5 is a state diagram of the state machine in a syncer unit of one embodiment of the invention. The state machine stays in the initial state until the incoming VSI signal is detected as being equal to one. At that point, it transitions to a next state and pulses the output of the syncer. The state machine then transitions to a next state, where it remains until the incoming VSI signal returns to zero. Then it returns to the initial state, where it waits for a next occurrence of the VSI signal being one.

Figure 6:
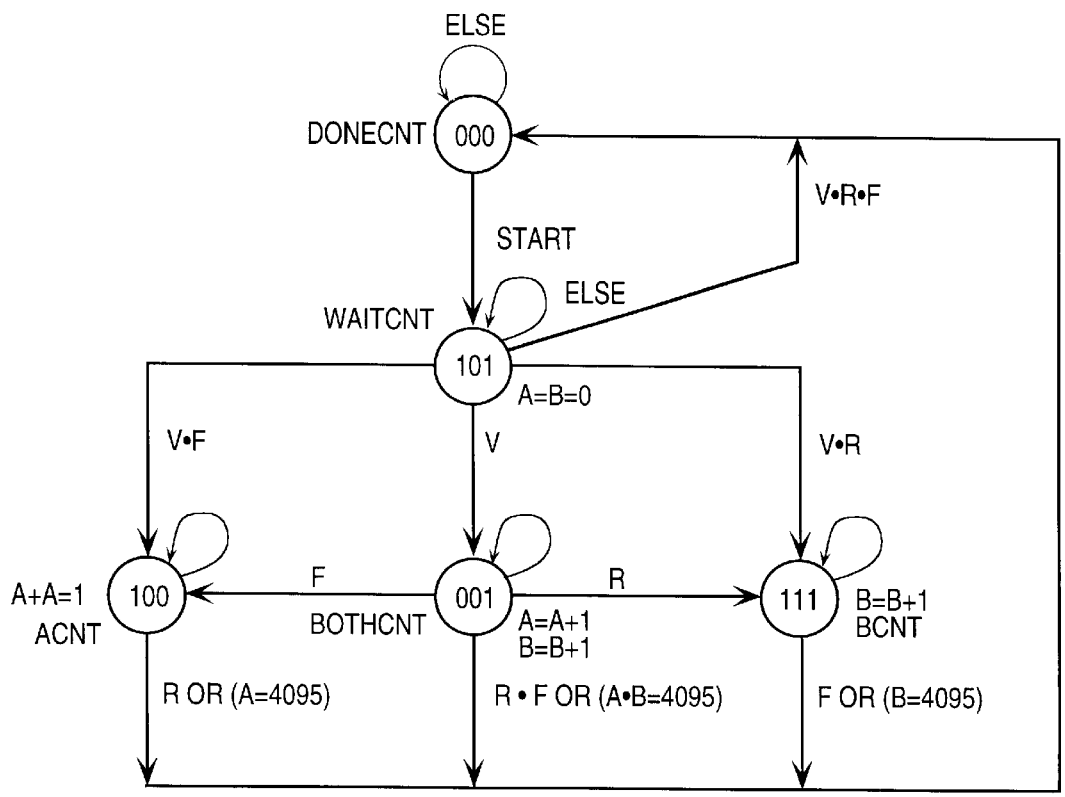
FIG. 6 is a state diagram of a state machine of a comp unit of one embodiment of the invention.

FIG. 6 is a state diagram of a state machine of account unit of one embodiment of the invention. In an initial state, a done count condition exists. The state machine remains in the done count state until a START signal is received. Once the START signal is received, the state machine transitions to a wait count state.

At the wait count state, the A and B counters are reset to zero. If at the wait count state, the VSIs for the reference, FIFO, and video in all arrive simultaneously, the state machine transitions back to the done count state. If at wait count state, the video in VSI and FIFO out VSIs are both received simultaneously, the state machine transitions to an A count state. In the A count state, the A counter is incremented on each clock until A hits a maximum count or the reference pulse is received. Alternatively, if at the wait count state, the reference and video in VSIs are simultaneously received, the state machine transitions into a B count state. In the B count state, the B counter is incremented one on each clock pulse until it reaches a predetermined maximum or the FIFO out VSI is received. If the video in VSI arrives alone, the state machine transitions to a both count state.

In the both count state, A and B both count on each clock pulse until additional VSIs are received (or a maximum count is reached). If the state machine is in the both count state and a FIFO out VSI is received alone, a transition to the A count state occurs. If the state machine is in the both count state and a reference VSI is received alone, the state machine transition into the B count state.

If from the both count state, the reference and FIFO VSIs are received simultaneously or A and B both reach their predetermined maximum, the state machine returns to the done count state and asserts a done count signal. Similarly, when the until conditions are satisfied from either the A count or B count states, the state machine transitions to the done count state and asserts the done count signal.

Figure 7:
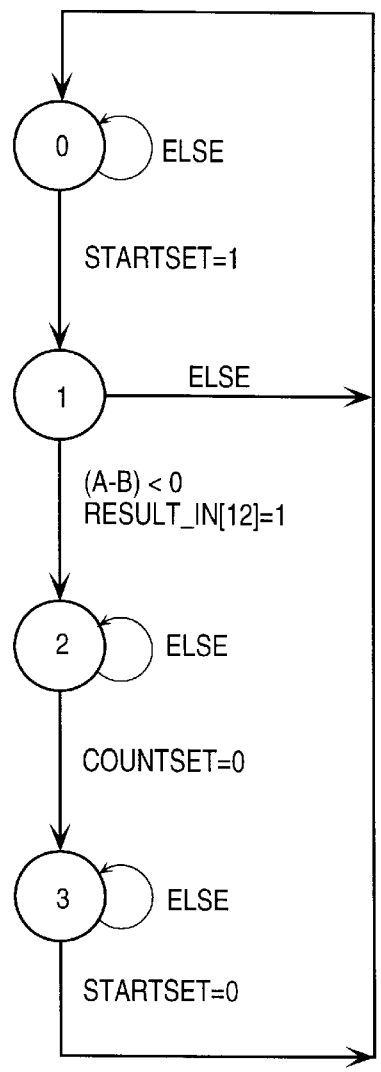
FIGS. 7 and 8 are state diagrams of a FIFO empty and FIFO fill state machines, respectively.
Figure 8:
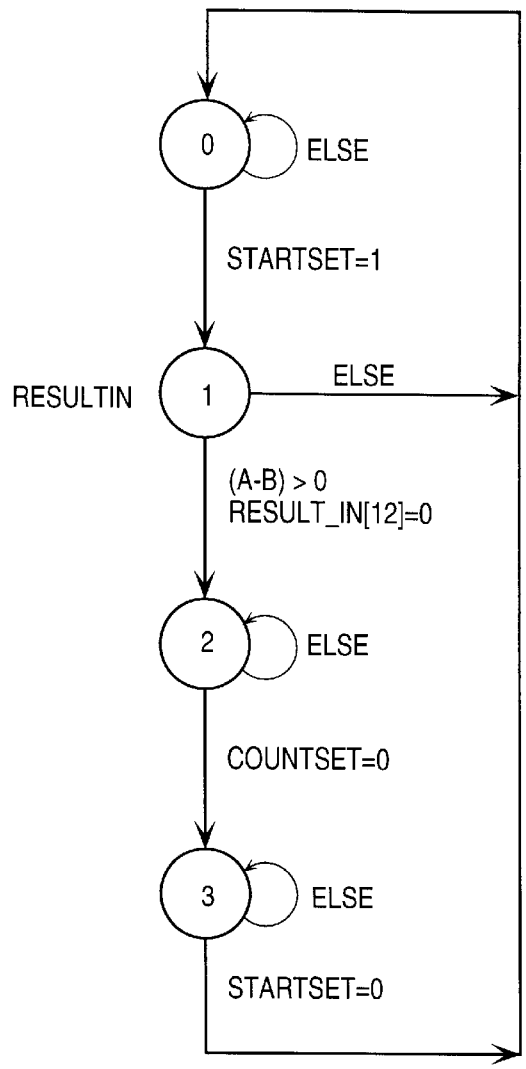

FIGS. 7 and 8 are state diagrams of a FIFO empty and FIFO fill state machines, respectively. At an initial state zero, both state machines are idle. When a start set signal is received, a transition to state one in which they load the result of the counter calculation. For the FIFO fill state machine, from state one, if A−B is greater than zero, the state machine transitions to state two. In state two, it suppresses a read enable on each clock and decrements the counter until the counter equals zero. Once the counter equals zero, it transitions to state three, where it remains until start set is returned to zero, then transitions back to the idle state. If A−B is not greater than zero at state one, the FIFO fill machine returns to the idle state. Conversely, if A−B is greater than zero, the FIFO empty state machine transitions from state one to state two. In state two, the write enable is suppressed and a counter decremented until the counter equals zero. Once the counter equals zero, the state machine transitions into state three, where it waits until start set is returned to zero. Then the state machine transitions back to the idle state.

Figure 9:
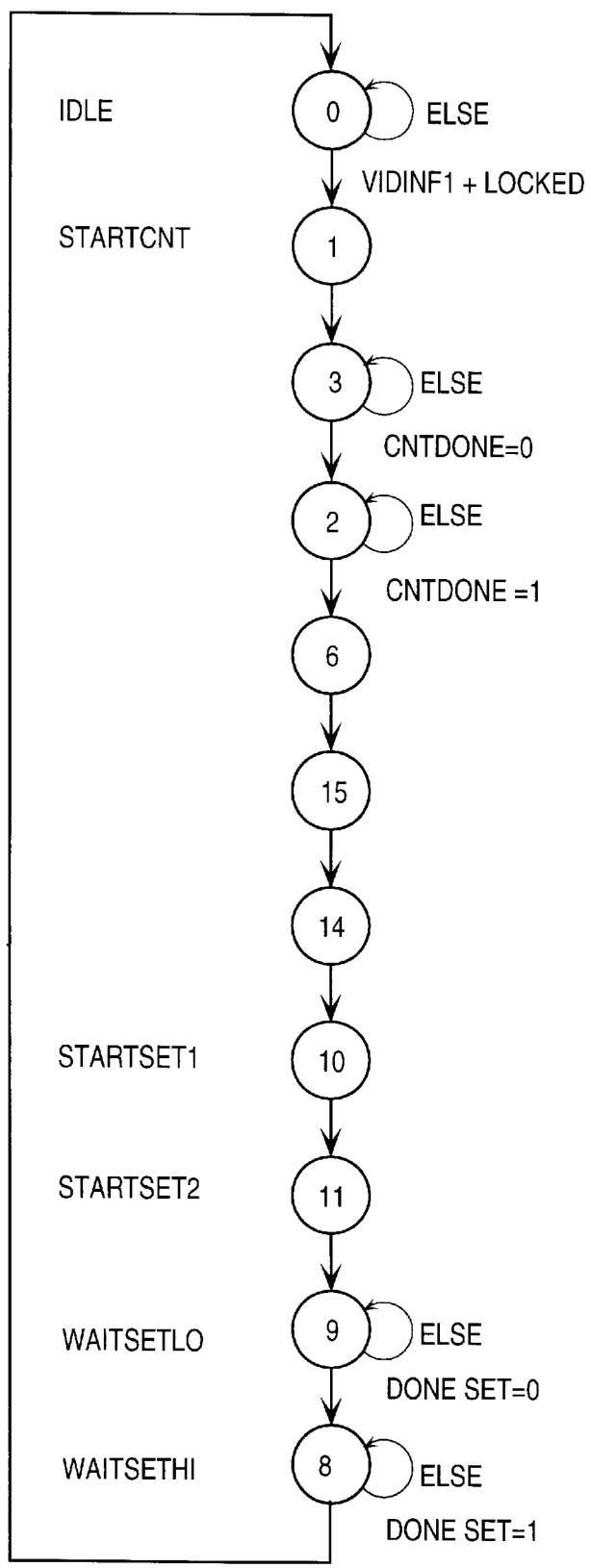
FIG. 9 is a state diagram of a state machine that forms a portion of a control unit of one embodiment of the invention.

FIG. 9 is a state diagram of a state machine that forms a portion of a control unit of one embodiment of the invention. When in state 0, the control unit is idle. The state machine remains in state 0 until it receives a VIDINLOCKED signal and a pulse from VIDINVSI$_{F1}$. At state one, the control unit asserts a START COUNT signal and transitions to state three. The state machine remains in state three until the COUNT DONE signal is equal to zero. When the COUNT DONE is equal to one, it transitions to state 2. The state machine remains in state 2 until the COUNT DONE signal is asserted by the counter unit. The state machine then transitions through states 16, 15, and 14, which are wait states waiting for the calculations of the difference between the counter to complete. Then at states 10 and 11, start set is asserted for two clocks. This is desirable to ensure that the FIFO empty unit which is driven by the external clock sees the START SET signal. The state machine then transitions to state 9 where it waits until it sees DONE SET zero. Then, it transitions to state 8 where it waits until it sees DONE SET high, after which it returns to the idle state.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:
   a first detector to detect a boundary in an input video stream;
   a second detector to detect a boundary in a reference video stream;
   a state machine to control assertion of at least one of a write enable signal and a read enable signal to a FIFO such that a boundary of a video stream out of the FIFO is coincident with the boundary of the reference video stream.

2. The apparatus of claim 1 further comprising:
   a first counter to count a time between the boundary in the input video stream and the boundary in the reference video data; and
   a second counter to count a time between the boundary in the input video stream and the boundary in the output video stream.

3. The apparatus of claim 2, further comprising:
   a calculation unit to determine a difference between a count of the first counter and a count of the second counter.

4. The apparatus of claim 2 further comprising:
   a state machine to start the first and the second counter responsive to receipt of a VSI of the input video stream, the state machine to stop the first counter responsive to a reference VSI and to stop the second counter responsive to an output VSI.

5. The apparatus of claim 1, wherein the apparatus is instantiated as a field programmable gate array (FPGA).

6. The apparatus of claim 1, wherein the state machine comprises:
   a first state machine to suppress a read enable if a FIFO delay is to be increased; and
   a second state machine to suppress a write enable if the FIFO delay is to be decreased.

7. The apparatus of claim 1 further comprising:
   means for determining an out of range condition.

8. The apparatus of claim 1 further comprising:
   means for determining an early or a late condition.

9. A method comprising:
   determining a difference between a vertical synchronization information (VSI) in an output video stream and a corresponding VSI in a reference video stream; and
   controlling assertion of at least one of a write enable and a read enable for a FIFO to reduce the difference.

10. The method of claim 9 wherein determining comprises:
    detecting a first vertical synchronization information (VSI) in a first video stream;
    starting a first counter and a second counter responsive to detecting the first VSI;
    detecting a reference VSI in the reference video stream;
    stopping the first counter responsive to the reference VSI;
    detecting an output VSI in the output video stream; and
    stopping the second counter responsive to the output VSI.

11. The method of claim 10 wherein determining further comprises:
    subtracting a value of the second counter from the value of the first counter to determine a net difference.

12. The method of claim 9 further comprising:
    comparing a first counter value with a maximum FIFO delay; and
    alerting a user if the value exceeds a maximum FIFO delay.

13. The method of claim 9 further comprising:
    identifying if the FIFO is too full or too empty;
    preventing assertion of the write enable if the FIFO is too full; and
    preventing assertion of the read enable if the FIFO is too empty.

14. The method of claim 11 wherein a sign of the net difference indicates whether the FIFO is too full or too empty.

15. The method of claim 9 further comprising:
    periodically repeating the determining and controlling to dynamically retime the output video stream.

16. A system comprising:
    a reference video source;
    an incoming video source;
    a FIFO coupled to receive video from the incoming video source and deliver an output video stream; and
    a retimer coupled to the FIFO, the retimer to determine a difference between a vertical synchronization information (VSI) in the reference video stream and a corresponding VSI in the output video stream and to control assertion of at least one of a read enable and a write enable to reduce the difference.

17. The system of claim 16 wherein the retimer comprises:
    a first detector to detect a boundary in an input video stream;
    a second detector to detect a boundary in a reference video stream;
    a state machine to control assertion of at least one of a write enable signal and a read enable signal to a FIFO such that a boundary of a video stream out of the FIFO is coincident with the boundary of the reference video stream.

18. The system of claim 17 wherein the retimer further comprises:
    a first counter to count a time between the boundary in the input video stream and the boundary in the reference video data; and
    a second counter to count a time between the boundary in the input video stream and the boundary in the output video stream.

19. The system of claim 18 wherein the retimer further comprises:

a calculation unit to determine a difference between a count of the first counter and a count of the second counter.

20. The system of claim 18 wherein the retimer further comprises:

a state machine to start the first and the second counter responsive to receipt of a VSI of the input video stream, the state machine to stop the first counter responsive to a reference VSI and to stop the second counter responsive to an output VSI.

* * * * *